United States Patent
Kawasaki et al.

(10) Patent No.: US 11,480,939 B2
(45) Date of Patent: Oct. 25, 2022

(54) MULTI-AXIS PROCESSING MACHINE AND ROTATION CENTER MEASUREMENT METHOD OF MULTI-AXIS PROCESSING MACHINE

(71) Applicant: Sodick Co., Ltd., Kanagawa (JP)

(72) Inventors: Michihisa Kawasaki, Kanagawa (JP); Shoya Yokota, Kanagawa (JP); Munetaka Ambai, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 27 days.

(21) Appl. No.: 17/197,052

(22) Filed: Mar. 10, 2021

(65) Prior Publication Data
US 2021/0325846 A1 Oct. 21, 2021

(30) Foreign Application Priority Data

Apr. 15, 2020 (JP) .............................. JP2020-072646

(51) Int. Cl.
*G05B 19/404* (2006.01)
*B23Q 15/12* (2006.01)

(52) U.S. Cl.
CPC ........... *G05B 19/404* (2013.01); *B23Q 15/12* (2013.01); *G05B 2219/50062* (2013.01)

(58) Field of Classification Search
None
See application file for complete search history.

(56) References Cited

U.S. PATENT DOCUMENTS

| | | | |
|---|---|---|---|
| 8,494,800 B2 | 7/2013 | Matsushita | |
| 9,164,502 B2 | 10/2015 | Sakai et al. | |
| 2010/0030368 A1 | 2/2010 | Hon et al. | |
| 2010/0207567 A1* | 8/2010 | Mori | B23Q 17/22 318/632 |

FOREIGN PATENT DOCUMENTS

| | | |
|---|---|---|
| JP | 2007044802 | 2/2007 |
| JP | 2010032373 | 2/2010 |
| JP | 2011038902 | 2/2011 |
| JP | 2015051493 | 3/2015 |
| JP | 5875568 | 3/2016 |

* cited by examiner

*Primary Examiner* — Ryan A Jarrett
(74) *Attorney, Agent, or Firm* — JCIPRNET

(57) ABSTRACT

The disclosure is a rotation center measurement method of a multi-axis processing machine which relatively moves tables on which a work piece is placed and a tool for processing the work piece by control of rotation axes based on a processing program, and the rotation center measurement method is characterized to include: a processing program acquisition step in which the processing program is acquired; a processing program analysis step in which command angles of tool postures are read from the processing program and analyzed, and measurement angles are calculated based on the analysis results; and a geometric deviation measurement step in which a reference sphere is placed on the tables and the tables and the tool are relatively moved to measure a position of the reference sphere, and directions and positions of rotation centers of the rotation axes are calculated.

4 Claims, 16 Drawing Sheets

| processing program index n | command position | | | command angle | |
|---|---|---|---|---|---|
| | X-coordinate | Y-coordinate | Z-coordinate | A-axis ($\theta n$) | C-axis ($\varphi n$) |
| 1 | 5.2134 | 4.1356 | 2.1234 | 10.234 | 20.678 |
| 2 | 5.2132 | 4.1354 | 2.1231 | 8.544 | 20.001 |
| 3 | 5.2131 | 4.1350 | 2.1232 | 9.123 | 18.675 |
| 4 | 5.2130 | 4.1352 | 2.1230 | 5.890 | 15.666 |
| 5 | ... | ... | ... | ... | ... |
| 6 | ... | ... | ... | ... | ... |
| 7 | ... | ... | ... | ... | ... |
| 8 | ... | ... | ... | ... | ... |

FIG. 5

MULTI-AXIS PROCESSING MACHINE AND ROTATION CENTER MEASUREMENT METHOD OF MULTI-AXIS PROCESSING MACHINE

CROSS-REFERENCE TO RELATED APPLICATION

This application claims the priority benefits of Japanese application no. 2020-072646, filed on Apr. 15, 2020. The entirety of the above-mentioned patent application is hereby incorporated by reference herein and made a part of this specification.

BACKGROUND

Technical Field

The disclosure relates to a multi-axis processing machine and a rotation center measurement method of multi-axis processing machine capable of accurately measuring a geometric error of a rotation axis.

Related Art

Conventionally, a multi-axis processing machine is known which brings a tool close to an object to be processed (hereinafter referred to as a work piece) from a plurality of angles and processes the object to be processed into a complicated shape. For example, a five-axis processing machine such as a machining center or the like which is configured by three linear axes and two rotation axes includes tables which rotate around an A-axis and a C-axis, and a tool which slides and moves along an X-axis, a Y-axis, and a Z-axis; the five-axis processing machine places a work piece on the tables, and causes the tool to slide and move while rotating and moving the work piece around the A-axis and the C-axis to process the work piece into various shapes. In this five-axis processing machine, due to factors such as an error that occurs during assembly, bending due to a weight of the work piece or the rotation axis itself, displacement due to heat of the rotation axis, and the like, a geometric error (a geometric deviation) occurs in positions, directions, or the like of the rotation centers of the rotation axes. Furthermore, the number of geometric deviations between the axes increases as the number of axes increases, and processing precision of the work piece is greatly affected.

Thus, in order to solve the problem of the processing precision of the work piece, a method for obtaining positions and directions of actual rotation centers before processing is performed.

Specifically, as shown in FIG. 11, a reference sphere and a touch probe are prepared, the reference sphere is installed on a swivel table, and the touch probe is mounted on a mounting unit of a processing head (S01). Then, while the table is rotated around a desired rotation axis and the rotation angle is changed, a position of the reference sphere having different rotation angles is measured at three points by the touch probe (S02). The direction of the rotation center is calculated by obtaining a normal vector of a plane passing through the three measured points (S03). Furthermore, by approximation of an arc passing through the three measured points, a center point of the arc is obtained, and the position of the rotation center is calculated according to a straight line passing through the center point of the arc and other rotation axes (S04).

However, when the position of the rotation center is obtained by the arc approximation, the obtained position of the rotation center varies depending on the rotation angles for measuring the position of the reference sphere. For example, when the position of the reference sphere is measured at a specific rotation angle as in methods described in patent literature 1 (Japanese Patent Laid-Open No. 2011-038902) and patent literature 2 (Japanese Patent No. 5875568), because the rotation angles of the reference sphere used before the processing are different from the rotation angles actually used in a processing program, the position of the rotation center shifts and the processing precision deteriorates.

The disclosure provides a multi-axis processing machine and a rotation center measurement method of multi-axis processing machine, which calculate more accurate rotation centers of rotation axes and directions of the rotation centers to improve processing precision of a work piece.

SUMMARY

The disclosure is a rotation center measurement method of a multi-axis processing machine which relatively moves tables on which a work piece is placed and a tool for processing the work piece by control of rotation axes based on a processing program, and the rotation center measurement method includes: a processing program acquisition step in which a processing program is acquired; a processing program analysis step in which command angles of tool postures are read from the processing program and analyzed, and measurement angles are calculated based on the analysis results; and a geometric deviation measurement step in which the tables on which a reference sphere is placed and the tool are relatively moved to measure a position of the reference sphere, and directions and positions of rotation centers of the rotation axes are calculated.

In addition, the disclosure is a multi-axis processing machine which processes a processing program by a numeric value control unit and an overall control unit to drive servo motors of rotation axes, thereby relatively moving tables on which a work piece is placed and a tool for processing the work piece, wherein the numeric value control unit executes: a processing program acquisition step in which the processing program is acquired; a processing program analysis step in which command angles of tool postures are read from the processing program and analyzed, and measurement angles are calculated based on the analysis results; and a geometric deviation measurement step in which the tables on which a reference sphere is placed and the tool are relatively moved to measure a position of the reference sphere, and directions and positions of rotation centers of the rotation axes are calculated.

Here, the "tables" refer to a tilt table and a swivel table of the embodiment. According to the disclosure, the processing program used during actual processing of the work piece is analyzed, the command angles of the tool postures often used in the processing program are calculated, measurement angles of the reference sphere which is used in the geometric deviation measurement step are derived based on the command angles. Thus, a problem can be avoided that the positions and the directions of the rotation centers of the rotation axes when the reference sphere is used to measure the geometric deviation shift from positions and directions of the actual rotation centers of the rotation axes, and the processing error can be minimized.

In the rotation center measurement method of multi-axis processing machine of the disclosure, in the processing program analysis step, frequency distributions of the command angles are calculated, and the command angles having a high appearance frequency are used as the measurement angles.

In addition, in the rotation center measurement method of multi-axis processing machine of the disclosure, in the processing program analysis step, the command angles whose appearance frequency exceeds a predetermined threshold value are calculated from the frequency distributions, and a lower limit value, an upper limit value, and a median value among the command angles whose appearance frequency exceeds a predetermined threshold value are used as the measurement angles.

Here, the "frequency distribution of the command angle" refers to a distribution condition of the appearance frequency of each command angle when a set of data of the command angles included in the processing program is divided for each command angle. In addition, the "frequency distribution of the command angle" also includes a distribution condition of an appearance frequency of command angles belonging to each section when the set of data of the command angles included in the processing program is divided into several sections.

Here, the "appearance frequency" is an amount indicating how many times a specific character or symbol appears in a data group, and is synonymous with the number of appearances. In the specification, the "appearance frequency" is used as an amount indicating how many times a specific command angle appears in the set of data of the command angles included in the processing program.

According to the disclosure, the frequency distributions of the command angles of the tool postures used in the processing program are calculated, and the command angles having a high appearance frequency are used as the measurement angles, and thus, the measurement angles used in the geometric deviation measurement can be simply and accurately calculated.

The disclosure causes a computer to execute: the processing program acquisition step in which the processing program of a multi-axis processing machine is acquired; and the processing program analysis step in which command angles of tool postures are read from the processing program and analyzed, and the measurement angles for calculating the directions and the positions of the rotation centers of the rotation axes of the multi-axis processing machine are calculated based on the analysis results.

According to the disclosure, by executing all of the processing program acquisition step, the processing program analysis step, and the geometric deviation measurement step on the multi-axis processing machine, directions and positions of accurate rotation centers of the rotation axes can be calculated without adding additional equipment, and capital investment can be minimized.

In addition, according to the disclosure, the processing program acquisition step and the processing program analysis step are executed on a computer different from the multi-axis processing machine, and thereby the measurement angles are calculated in advance, and the geometric deviation measurement step is executed using the measurement angles already calculated on the multi-axis processing machine immediately before processing the work piece. By performing the steps with different devices in this way, an initial setting time before processing the work piece can be shortened.

BRIEF DESCRIPTION OF THE DRAWINGS

FIG. 5 is a schematic diagram showing an outline of a processing program 201 of the five-axis processing machine 100 according to the embodiment.

DESCRIPTION OF THE EMBODIMENTS

The disclosure can provide a multi-axis processing machine and a rotation center measurement method of multi-axis processing machine, which calculate more accurate rotation centers of rotation axes and directions of the rotation centers to improve processing precision of a work piece. Furthermore, with the above configuration, the measurement angles used in the geometric deviation step can be easily and quickly obtained, and from a beginner to an advanced operator, any operator can obtain positions and directions of the accurate rotation centers of the rotation axes.

A five-axis processing machine 100 is described below with reference to the drawings as an embodiment of a multi-axis processing machine and a rotation center measurement method of multi-axis processing machine of the disclosure. Various features shown in the following embodiments can be combined with each other, and each independently configures the invention.

1. First Embodiment (1. Overall Configuration of Five-Axis Processing Machine 100)

Figure 1:
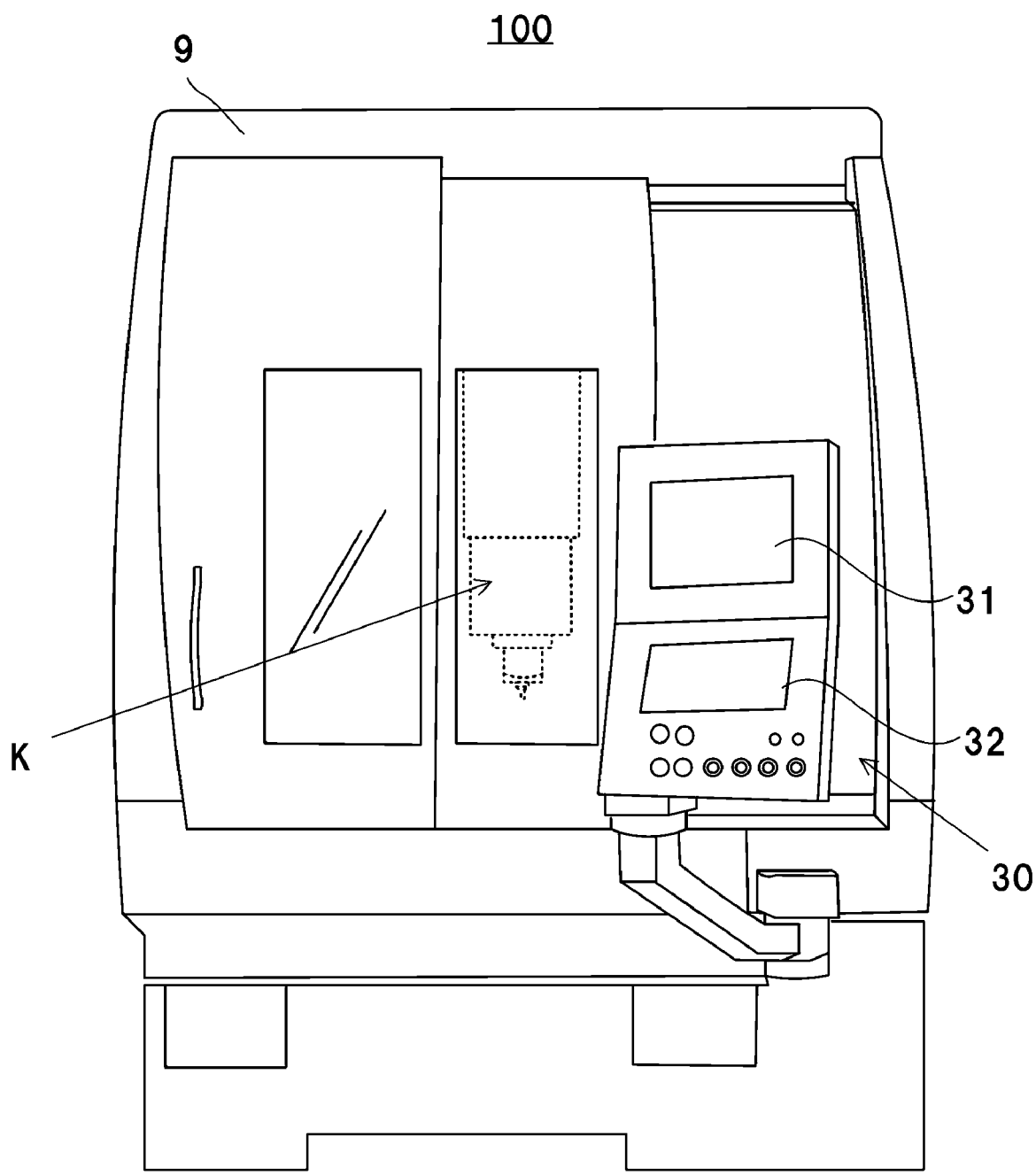
FIG. 1 is a schematic diagram of a five-axis processing machine 100 according to a first embodiment of the disclosure.
Figure 2:
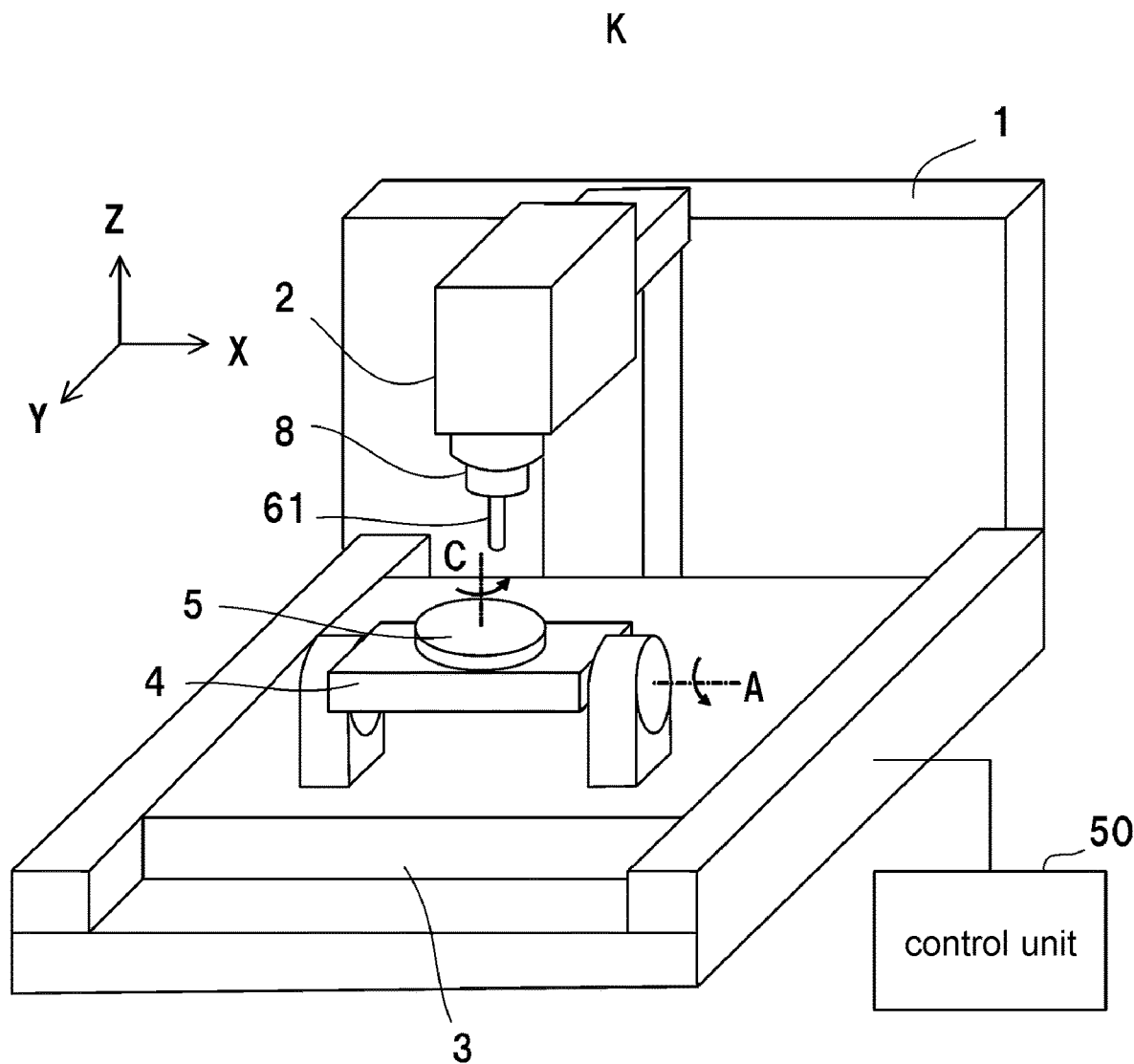
FIG. 2 is a schematic diagram showing an internal structure of the five-axis processing machine 100 according to the embodiment.

A configuration of the five-axis processing machine 100 is described with reference to FIGS. 1, 2 and 3. FIG. 1 is a schematic diagram of the five-axis processing machine 100 according to a first embodiment of the disclosure, and FIG. 2 is a schematic diagram showing an internal structure of the five-axis processing machine 100 according to the embodiment.

The five-axis processing machine 100 is a processing machine that performs control of five axes including three linear axes of an X-axis, a Y-axis, and a Z-axis and two rotation axes, and the five-axis processing machine 100 is a table swivel type that swivels a work piece W together with a tilt table 4. The X-axis, the Y-axis, and the Z-axis orthogonal to each other are set for the five-axis processing machine 100, an A-axis is set as a rotation axis around an axial center that extends parallel to the X-axis, and a C-axis is set as a rotation axis around an axial center that extends parallel to the Z-axis.

The five-axis processing machine 100 includes a base 1, a processing head 2, a Y-axis moving table 3, and the tilt table 4 placed on the Y-axis moving table 3 and configured to be rotatable around the A-axis, a swivel table 5 placed on the tilt table 4 and configured to be rotatable around the C-axis, and a control unit 50.

A processing area K including the base 1, the processing head 2, the Y-axis moving table 3, the tilt table 4, and the swivel table 5 is arranged in a housing 9 of the five-axis processing machine 100.

The processing head 2 is configured to be movable in the X-axis direction and the Z-axis direction with respect to the base 1. The processing head 2 is equipped with a mounting unit 8 for mounting a tool 61, and the tool 61 can be rotated to perform cutting processing by rotating the mounting unit 8.

The Y-axis moving table 3 is configured to be movable in the Y-axis direction with respect to the base 1. The tilt table 4 is placed on the Y-axis moving table 3. The swivel table 5 is further placed on the tilt table 4. An operator can process the work piece W with the tool 61 by placing the work piece W on the swivel table 5.

The tilt table 4 is configured to be rotatable around the A-axis which serves as the rotation axis, and is placed on the Y-axis moving table 3 in a manner that the A-axis and the X-axis are parallel to each other.

The swivel table 5 is configured to be rotatable around the C-axis which serves as the rotation axis, and when a rotation angle of the A-axis is 0°, the swivel table 5 is placed on the tilt table 4 in a manner that the C-axis and the Z-axis are parallel to each other. By rotating the tilt table 4 and the swivel table 5 around the A-axis and the C-axis at arbitrary angles, a posture of the work piece W placed on the swivel table 5 with respect to the tool can be changed for processing.

In this way, it is desirable that the A-axis of the tilt table 4 is installed parallel to the X-axis and the C-axis of the swivel table 5 is installed parallel to the Z-axis, but in reality, the A-axis and the C-axis are respectively mounted in a tilted state with respect to the X-axis and the Z-axis due to a processing error or a mounting error of each table. Therefore, in the embodiment, positions and directions of actual rotation centers of the A-axis and the C-axis are measured and used for subsequent processing. Here, the "position of the rotation center" is a center coordinate of the rotation axis, and the "direction of the rotation center" is a vector indicating a direction of the rotation axis. A method for calculating geometric deviations of the A-axis and the C-axis is described later.

(1.2. Functional Configuration of Five-Axis Processing Machine 100)

Figure 3:
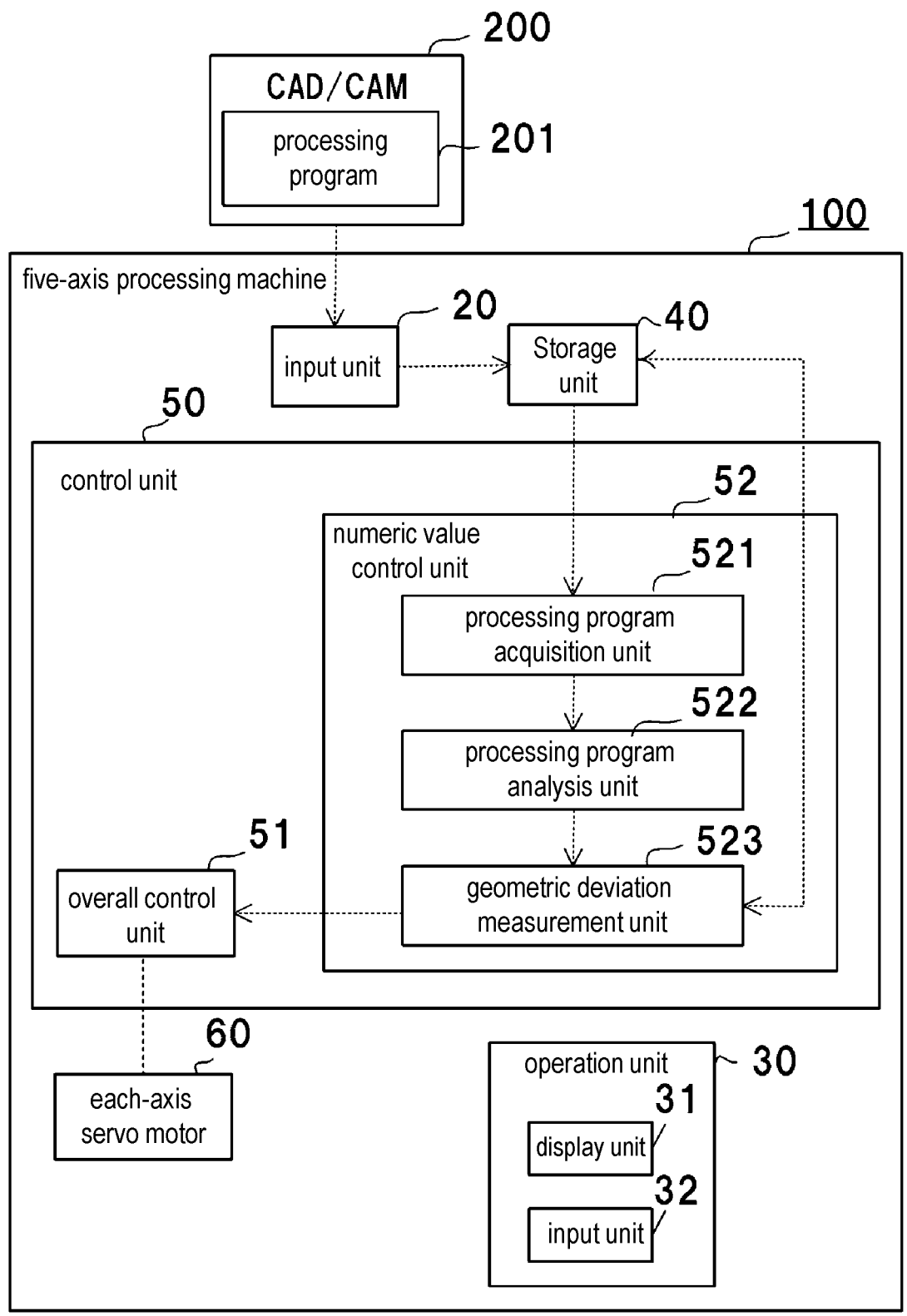
FIG. 3 is a block diagram of the five-axis processing machine 100 according to the embodiment.

FIG. 3 is a block diagram of the five-axis processing machine 100 according to the embodiment. As shown in FIG. 3, the five-axis processing machine 100 includes an input unit 20, an operation unit 30, a storage unit 40, a control unit 50, and servo motors 60.

The five-axis processing machine 100 is connected to a CAD/CAM device 200, acquires a processing program 201 from the CAD/CAM device 200 via the input unit 20, and stores the processing program 201 in the storage unit 40. In addition, the control unit 50 drives, based on the processing program 201, each servo motor 60 arranged on the Y-axis moving table 3, the tilt table 4, the swivel table 5, and the tool 61.

FIG. 5 is a schematic diagram showing contents of the processing program 201 of the five-axis processing machine 100 according to the embodiment.

The CAD/CAM device 200 is a device that creates the processing program 201, and the CAD/CAM device 200 creates the processing program 201 for creating a processing shape of the work piece W and operating each machine based on the processing shape of the work piece W.

The processing program 201 is composed of a plurality of processing blocks (FIG. 5), and a G code that specifies a command position of a front-end point of the tool 61 and a command angle of a tool posture, an F code that commands a relative speed of the front-end point of the tool 61 with respect to the work piece W, and the like are described in the processing block. Here, the "tool posture" refers to a posture of the work piece relative to the tool, and the command angles of the tool postures are specified as the rotation angles of the rotation axes (the A-axis and the C-axis) for each processing block.

The processing program 201 is input from the CAD/CAM device 200 to the input unit 20. The processing program 201 may be input to the input unit 20 not only from the CAD/CAM device 200 but also by the operator via a storage medium.

The operation unit 30 includes a display unit 31 and a manual input unit 32, and a keyboard, a touch panel, or the like is used as the manual input unit 32. The operator can make various settings of the five-axis processing machine 100 by the manual input unit 32 according to contents displayed on the display unit 31.

The storage unit 40 is configured by, for example, a random access memory (RAM), a dynamic random access memory (DRAM), or the like, and is used as a work area or the like when processing is executed based on various programs by the control unit 50. In addition, the storage unit 40 includes a non-volatile memory such as a read only memory (ROM) or the like, or a solid state drive (SDD), and data such as a threshold value and the like and the programs used for the processing of the control unit 50 are stored.

The servo motors 60 are respectively arranged on the Y-axis moving table 3, the tilt table 4, the swivel table 5, and the tool 61. By driving each servo motor 60 according to commands of an overall control unit 51, each component can be rotated or moved.

(1.3. Functional Configuration of Control Unit 50)

The control unit 50 is configured by the overall control unit 51 and a numeric value unit 52.

The overall control unit 51 is configured by, for example, a central processing unit (CPU), a microprocessor, a digital signal processor (DSP), or the like, and the overall control unit 51 controls an overall operation of the five-axis processing machine 100 and drives each servo motor 60.

The numeric value unit 52 includes a processing program acquisition unit 521, a processing program analysis unit 522, and a geometric deviation measurement unit 523.

The processing program acquisition unit 521 executes a processing program acquisition step and acquires, from the storage unit 40, the processing program 201 selected by the operator via the operation unit 30.

The processing program analysis unit 522 executes a processing program analysis step. The processing program analysis unit 522 analyzes the processing program acquired by the processing program acquisition unit 521, and refers to command angles θn and φn (n is an index of the processing block, n=1, 2, . . . , N, and N is the number of the processing blocks) of the two rotation axes for each processing block in the processing program 201. Then, frequency distributions are calculated from the command angles θn and φn of the two rotation axes that are referred to, and measurement angles λ_θm and λ_μm for measuring geometric deviations are calculated and stored in the storage unit 40.

The geometric deviation measurement unit 523 rotates a reference sphere 63 at the measurement angles λ_θm and λ_φm calculated in the processing program analysis unit 522 to measure a position of the reference sphere 63, thereby calculating the directions and the positions of the actual rotation centers of the rotation axes and storing the directions and the positions in the storage unit 40.

(1.4. Description of Rotation Center Measurement Method)

Figure 4:
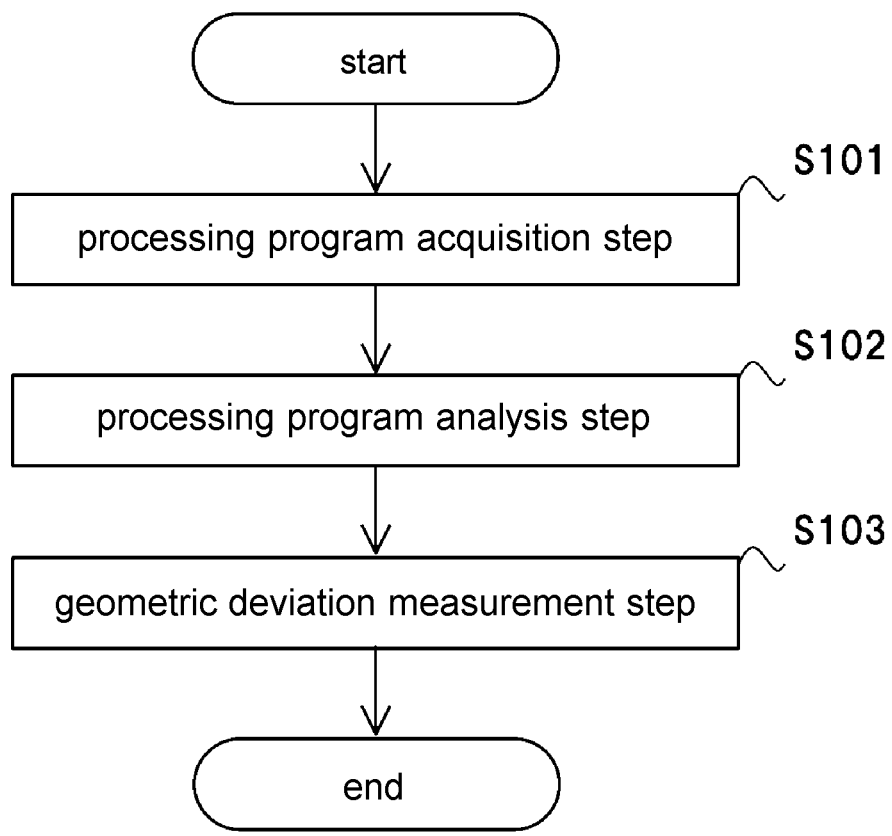
FIG. 4 is a flow chart showing a rotation center measurement method of the five-axis processing machine 100 according to the embodiment.
Figure 11:
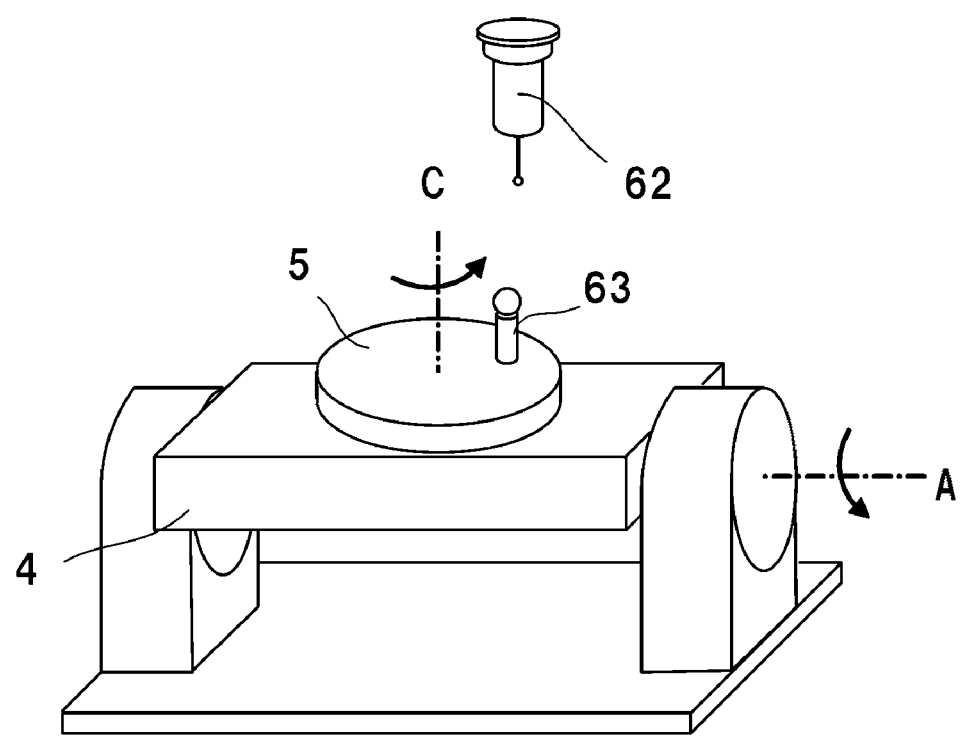
FIG. 11 is a schematic diagram of a touch probe 62 and a reference sphere 63 which is installed on a swivel table 5 according to the embodiment.

FIG. 4 is a flow chart showing a rotation center measurement method of the five-axis processing machine 100 according to the embodiment, and FIG. 11 is a schematic diagram of a touch probe 62 and the reference sphere 63 which is installed on the swivel table 5 according to the embodiment.

Before processing the work piece W, the operator performs the rotation center measurement as follows in order to measure the geometric deviations of the rotation axes of the five-axis processing machine 100.

The operator creates the processing program 201 by the CAD/CAM device 200 and the like and stores the processing program 201 in the storage unit 40 via the input unit 20. Next, the operator mounts the touch probe 62 on the mounting unit 8 of the processing head 2 and installs the reference sphere 63 on the swivel table 5 (FIG. 11). Then, when a setting screen displayed on the display unit 31 is operated via the manual input unit 32, the processing program 201 is read from the storage unit 40, and the processing program 201 is displayed on the setting screen. When the operator selects the processing program 201 displayed on the display unit 31 by the manual input unit 32 and presses a start button or the like for performing the rotation center measurement, the rotation center measurement is started, and the processing program acquisition unit 521 acquires the processing program 201 selected by the operator from the storage unit 40 (S101: processing program acquisition step).

Next, the processing program analysis unit 522 analyzes the processing program 201 acquired by the processing program acquisition unit 521, calculates the frequency distributions of the command angle θn with respect to the rotation axis A-axis and the command angle φn with respect to the rotation axis C-axis, calculates the measurement angles λ_θm and λ_φm (m=1, 2, . . . , M, and M is the number of the measurement angles) of the rotation axes A-axis and C-axis, and stores the calculated measurement angles λ_θm and λ_φm in the storage unit 40 (S102: processing program analysis step).

In order to measure the geometric deviations of the rotation axes, the measurement angles λ_θm and λ_φm must be three points or more (M≥3).

Then, the geometric deviation measurement unit 523 rotates the tilt table 4 around the A-axis at the measurement angle λ_θm to measure the position of the reference sphere 63, similarly rotates the swivel table 5 around the C-axis at the measurement angle λ_φm to measure the position of the reference sphere 63, calculates the directions and the positions of the actual rotation centers of the rotation axes from the position of the reference sphere 63, and stores the directions and the positions in the storage unit 40 (S103: geometric deviation measurement step).

(1.5. Specific Description of Processing Program Analysis Step)

Figure 6:
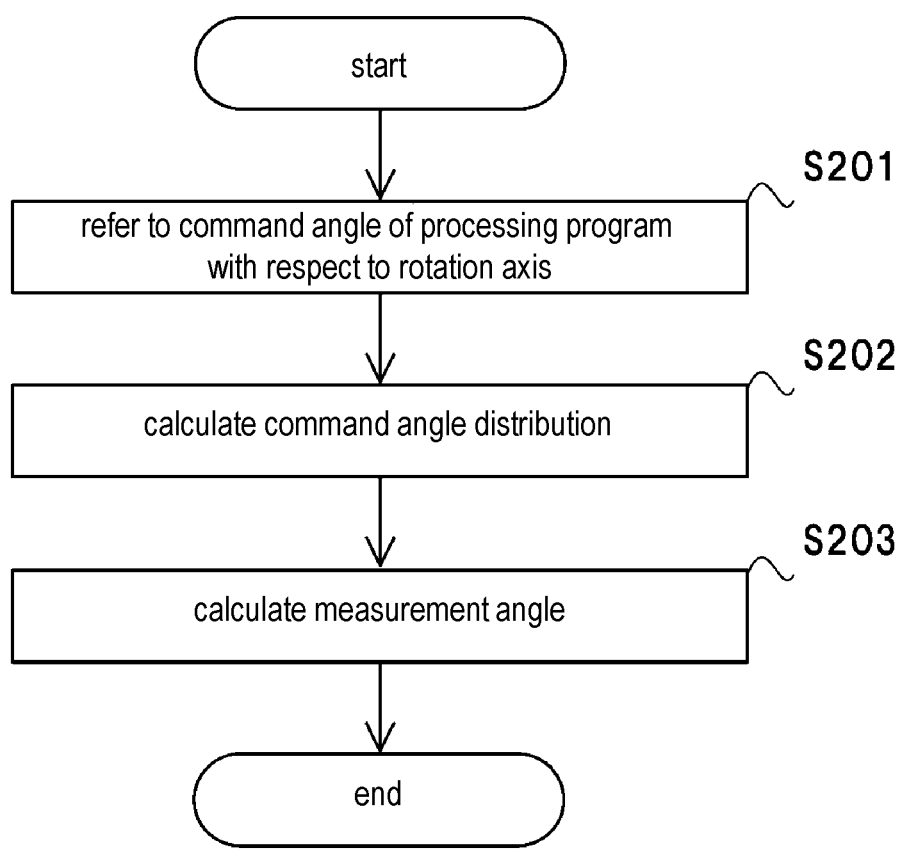
FIG. 6 is a flow chart showing a processing program analysis step of the five-axis processing machine 100 according to the embodiment.
Figure 7:
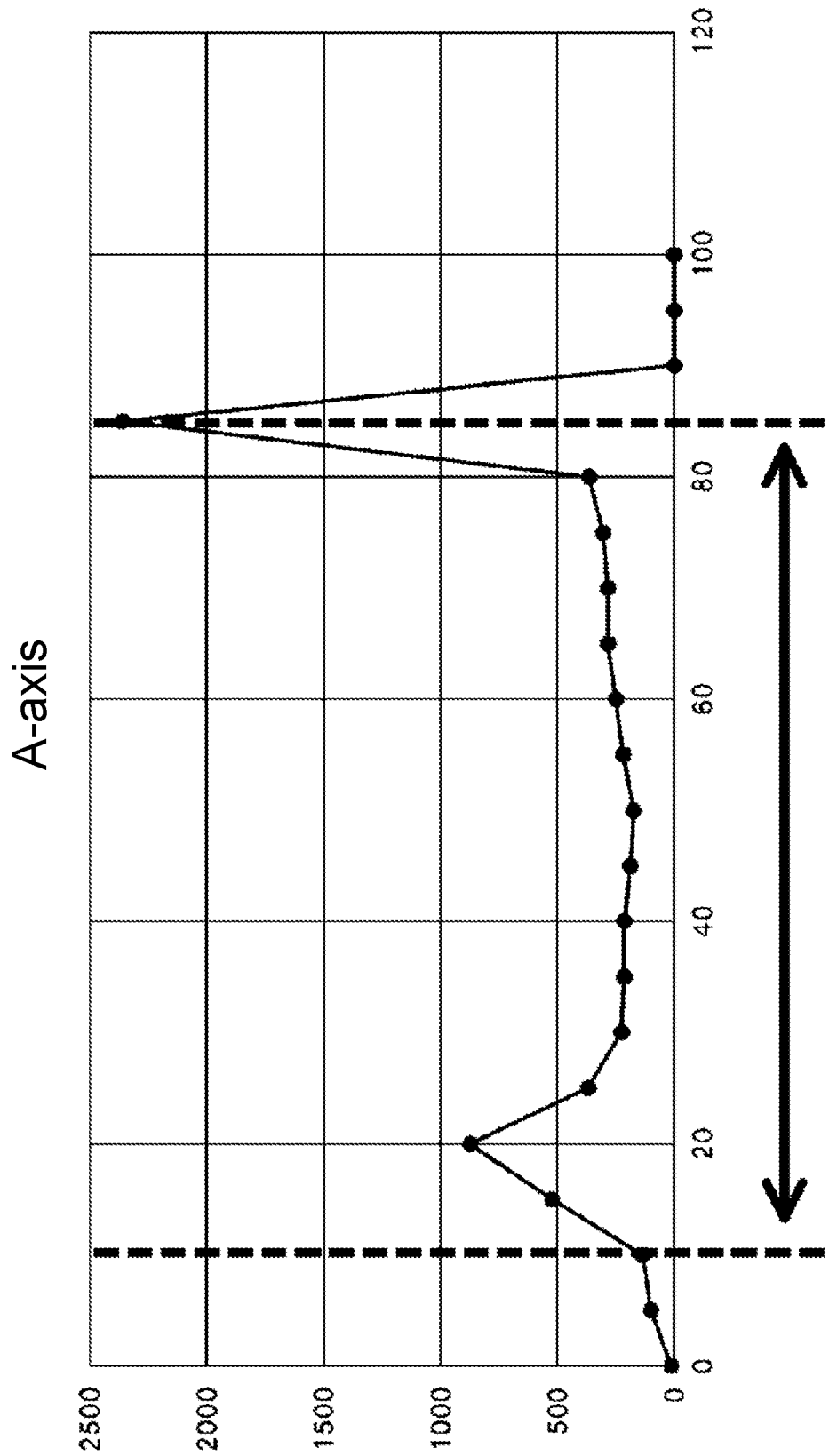
FIG. 7 is an example of a graph showing a frequency distribution of a command angle θn of a rotation axis A-axis in the processing program analysis step of the embodiment (a vertical axis represents an appearance frequency and a horizontal axis represents the command angle θn).
Figure 8:
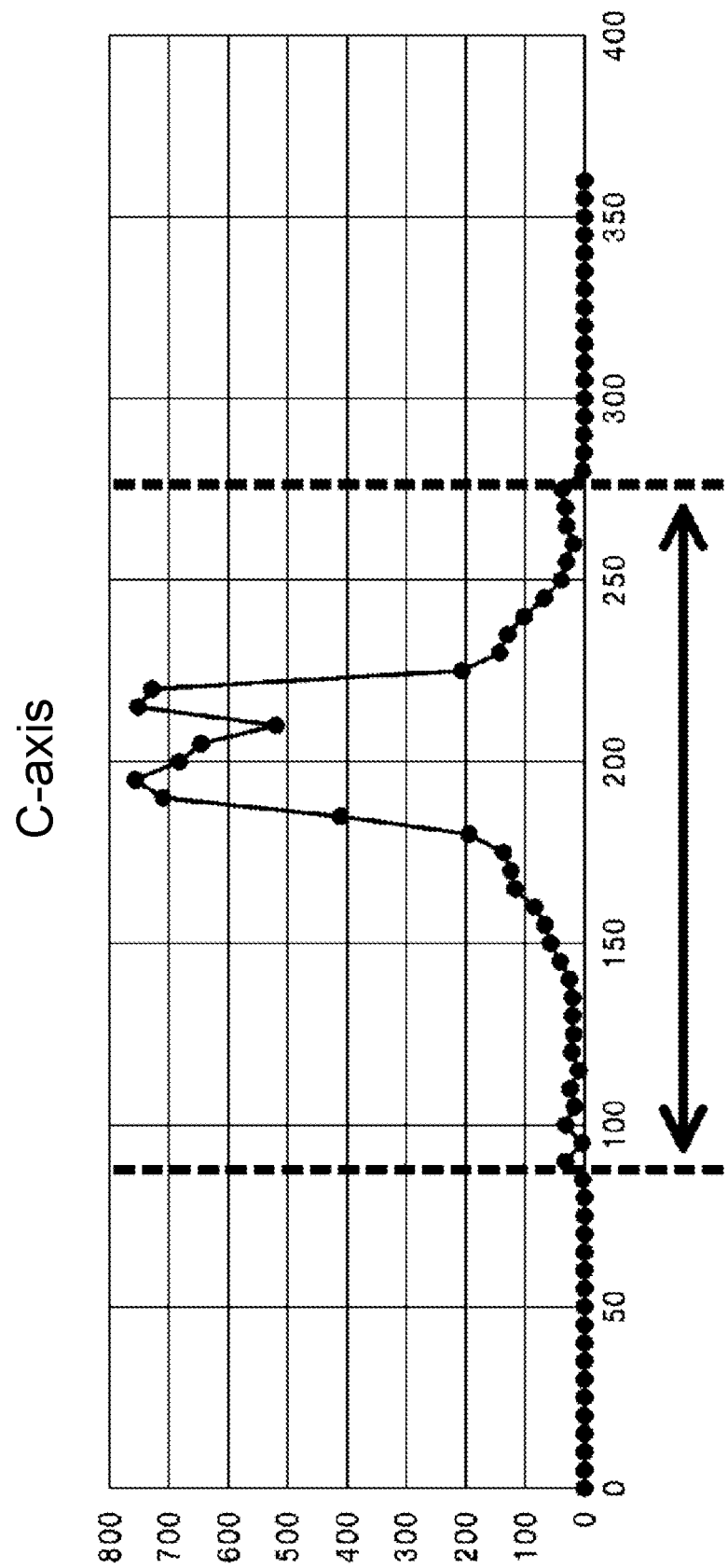
FIG. 8 is an example of a graph showing a frequency distribution of a command angle φn of a rotation axis C-axis in the processing program analysis step of the embodiment (a vertical axis represents an appearance frequency and a horizontal axis represents the command angle φn).
Figure 9:
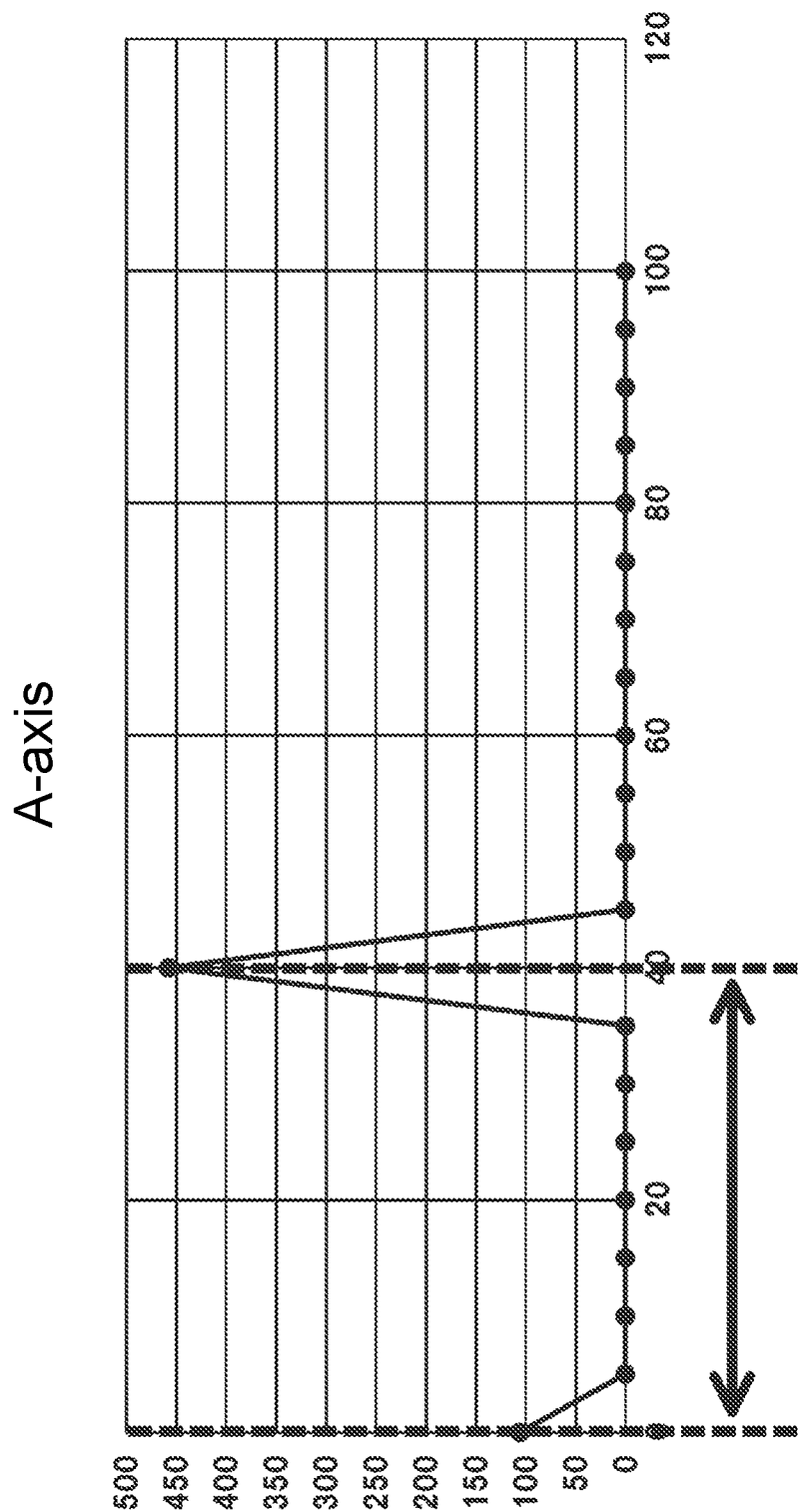
FIG. 9 is another example of the graph showing the frequency distribution of the command angle θn of the rotation axis A-axis in the processing program analysis step of the embodiment (a vertical axis represents an appearance frequency and a horizontal axis represents the command angle θn).
Figure 10:
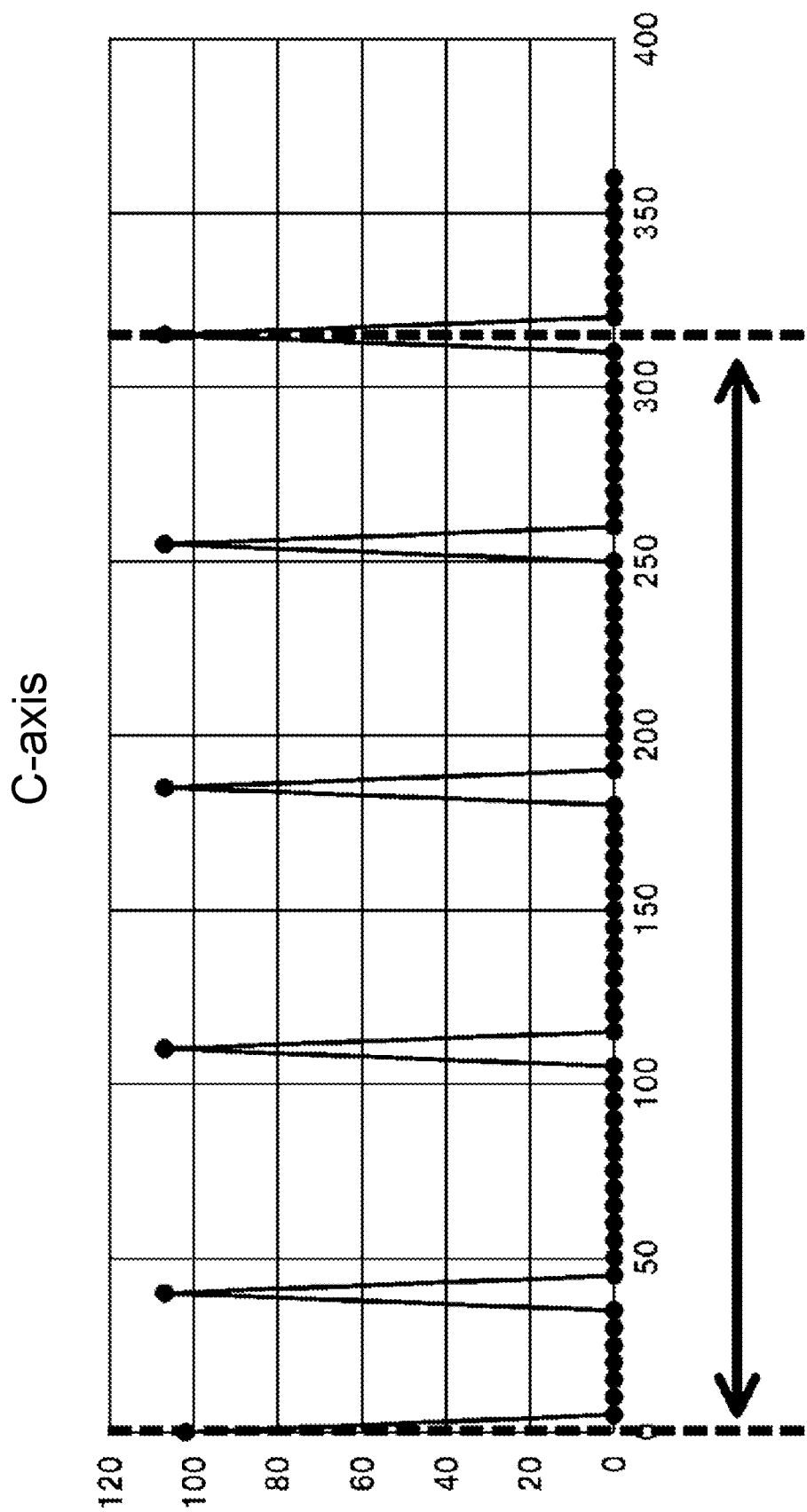
FIG. 10 is another example of the graph showing the frequency distribution of the command angle φn of the rotation axis C-axis in the processing program analysis step of the embodiment (a vertical axis represents an appearance frequency and a horizontal axis represents the command angle φn).

FIG. 6 is a flow chart showing the processing program analysis step of the five-axis processing machine 100 according to the embodiment, and FIG. 7 is an example of a graph showing the frequency distribution of the command angle θn of the rotation axis A-axis in the processing program analysis step of the embodiment (a vertical axis represents an appearance frequency and a horizontal axis represents the command angle θn). FIG. 8 is an example of a graph showing the frequency distribution of the command angle φn of the rotation axis C-axis in the processing program analysis step of the embodiment (a vertical axis represents an appearance frequency and a horizontal axis represents the command angle φn), and FIG. 9 is another example of the graph showing the frequency distribution of the command angle θn of the rotation axis A-axis in the processing program analysis step of the embodiment (a vertical axis represents an appearance frequency and a horizontal axis represents the command angle θn). FIG. 10 is another example of the graph showing the frequency distribution of the command angle φn of the rotation axis C-axis in the processing program analysis step of the embodiment (a vertical axis represents an appearance frequency and a horizontal axis represents the command angle φn).

When there are N processing blocks in the acquired processing program 201, the command angle θn of the rotation axis A-axis and the command angle φn of the rotation axis C-axis exist for each processing block (FIG. 5). Thus, the processing program analysis unit 522 refers to the inside of the processing program 201 (S201) and calculates the frequency distributions of the command angle θn with respect to the rotation axis A-axis and the command angle φn with respect to the rotation axis C-axis (S202).

For example, the frequency distribution of the command angle θn with respect to the rotation axis A-axis is calculated as shown in FIGS. 7 and 9, and the frequency distribution of the command angle φn with respect to the rotation axis C-axis is calculated as shown in FIGS. 8 and 10.

Next, based on the calculated frequency distributions, the geometric deviation measurement unit 523 calculates the measurement angles λ_θm and λ_φm used to obtain the positions and the directions of the actual rotation centers, and stores the calculated measurement angles λ_θm and λ_φm in the storage unit 40 (S203).

For example, when the frequency distribution of the command angle θn with respect to the rotation axis A-axis is shown in FIGS. 7 and 9, it is estimated that the command angle θn whose appearance frequency is equal to or higher than a predetermined threshold value is frequently used in the processing program 201. Three points of a lower limit value, an upper limit value, and a median value which is a value between the lower limit value and the upper limit value of the command angle θn whose appearance frequency is equal to or higher than a threshold value are used as the measurement angle λ_θm used in the geometric deviation measurement of the rotation axis A-axis. As the threshold value, a threshold value stored in the storage unit 40 in advance is used.

For example, in the frequency distribution of FIG. 7, the lower limit value of the command angle θn whose appearance frequency is equal to or higher than a threshold value is 10°, the upper limit value is 85°, and the median value is 47.5°. Thus, a measurement angle λ_θ1=10°, a measurement angle λ_θ2=47.5°, and a measurement angle λ_θ3=85°, and the obtained measurement angles λ_θ1, λ_θ2, and λ_θ3 are set as the rotation angles when the geometric deviation measurement is performed on the rotation axis A-axis. The median value may also be rounded off.

In addition, in the frequency distribution of FIG. 9, the lower limit value of the command angle θn whose appearance frequency is equal to or higher than a threshold value is 0°, the upper limit value is 40°, and the median value is 20°. Thus, the measurement angle λ_θ1=0°, the measurement angle λ_θ2=20°, and the measurement angle λ_θ3=40°, and the obtained measurement angles λ_θ1, λ_θ2, and κ_θ3 are set as the rotation angles when the geometric deviation measurement is performed on the rotation axis A-axis.

Furthermore, for example, when the frequency distribution of the command angle φn of the rotation axis C-axis is shown in FIG. 8, it is estimated that the command angle φn whose appearance frequency is equal to or higher than a predetermined threshold value is frequently used in the processing program 201. Three points of a lower limit value, an upper limit value, and a median value of the command angle φn whose appearance frequency is equal to or higher than a threshold value are used as the measurement angle λ_φm used in the geometric deviation measurement of the rotation axis C-axis. As the threshold value, a threshold value stored in the storage unit 40 in advance is used.

For example, in the frequency distribution of FIG. 8, the lower limit value of the command angle φn whose appearance frequency is equal to or higher than a threshold value is 90°, the upper limit value is 275°, and the median value is 182.5°. Thus, a measurement angle λ_φ1=90°, a measurement angle λ_φ2=275°, and a measurement angle λ_φ3=182.5°, and the obtained measurement angles λ_φ1, λ_φ2, and λ_φ3 are set as the rotation angles when the geometric deviation measurement is performed on the rotation axis C-axis. The median value may also be rounded off.

In addition, in the frequency distribution of FIG. 10, the lower limit value of the command angle φn whose appearance frequency is equal to or higher than a threshold value is 0°, the upper limit value is 315°, and the median value is 157.5°. Thus, the measurement angle λ_φ1=0°, the measurement angle λ_φ2=315°, and the measurement angle λ_φ3=157.5°, and the obtained measurement angles λ_φ1, λ_φ2, and λ_φ3 are set as the rotation angles when the geometric deviation measurement is performed on the rotation axis C-axis.

As a method for calculating the measurement angles λ_θm and λ_φm from the frequency distributions, a method of obtaining by a threshold value is described, but various methods can be applied such as a method of obtaining a peak of a frequency distribution to calculate a command angle having the highest appearance frequency as a measurement angle.

(1.6. Specific Description of Geometric Deviation Measurement Step)

Figure 12:
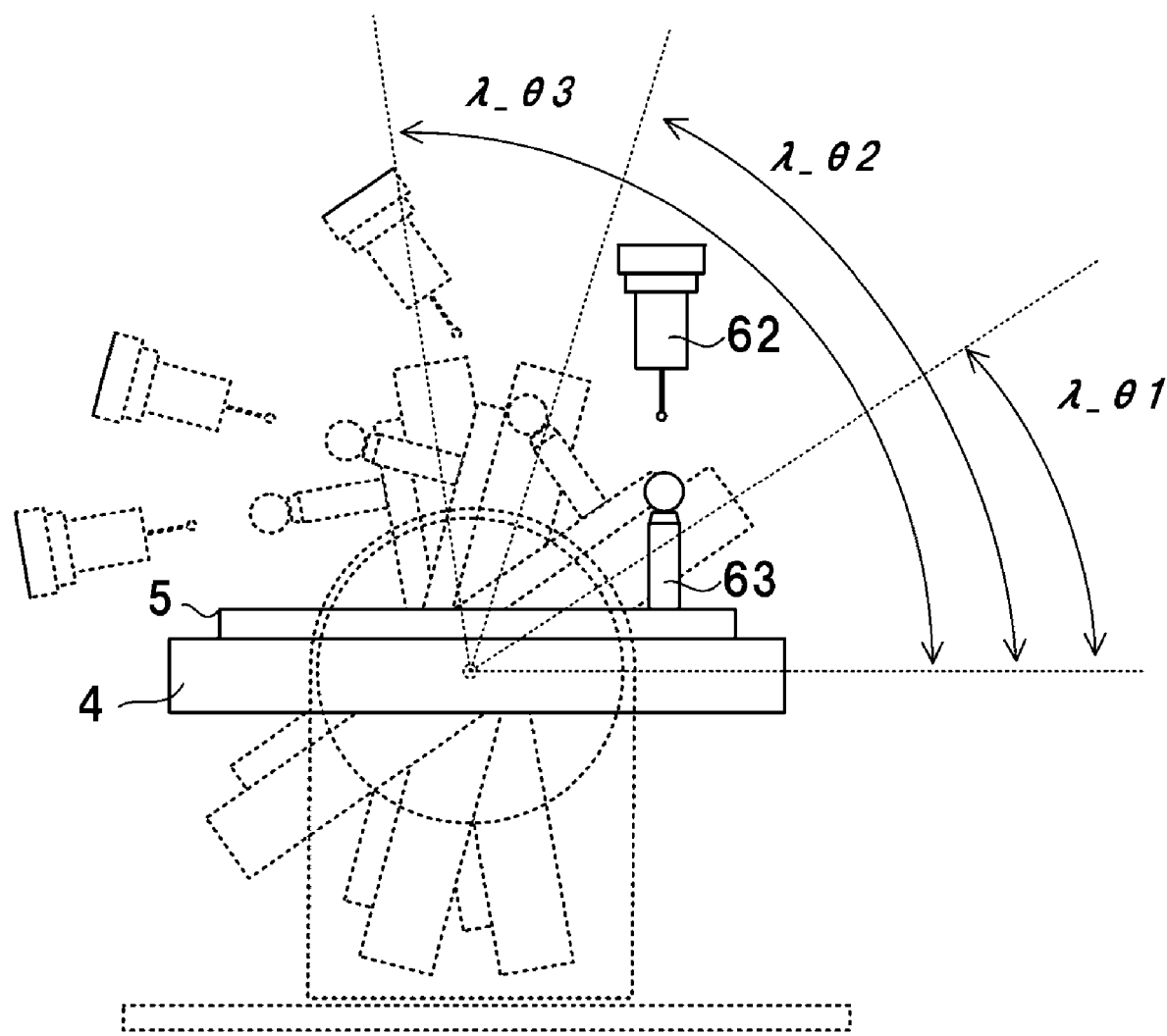
FIG. 12 is a schematic diagram illustrating a state in which a tilt table 4 is rotated around the A-axis in a geometric deviation measurement step according to the embodiment.
Figure 13:
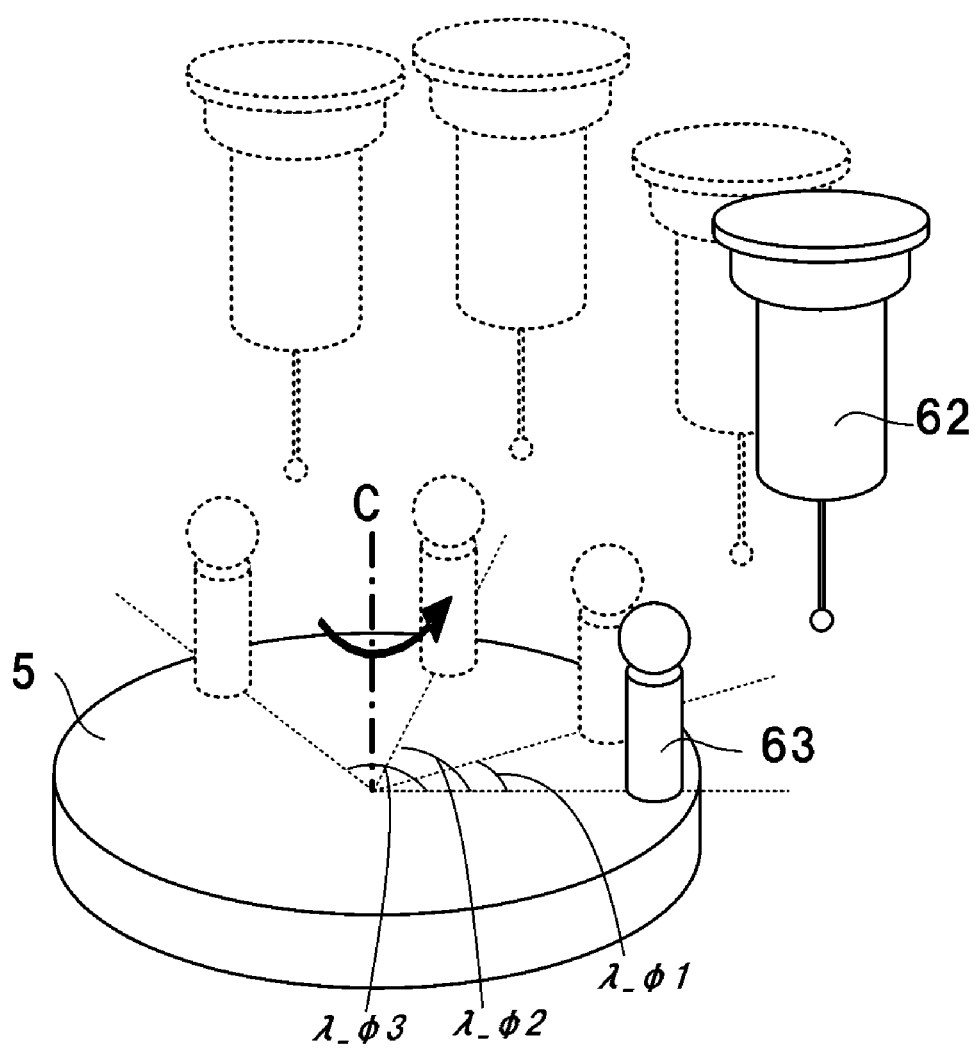
FIG. 13 is a schematic diagram illustrating a state in which the swivel table 5 is rotated around the C-axis in the geometric deviation measurement step according to the embodiment.
Figure 14:
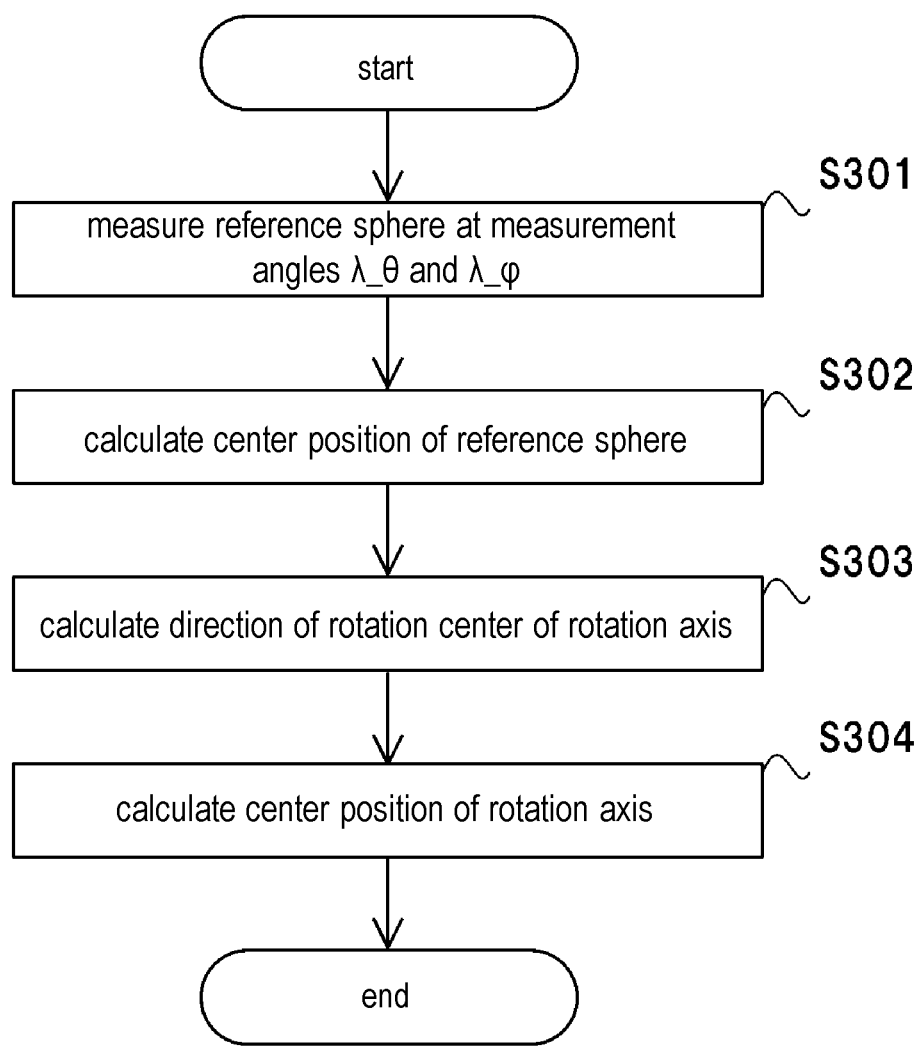
FIG. 14 is a flow chart showing the geometric deviation measurement step according to the embodiment.
Figure 15:
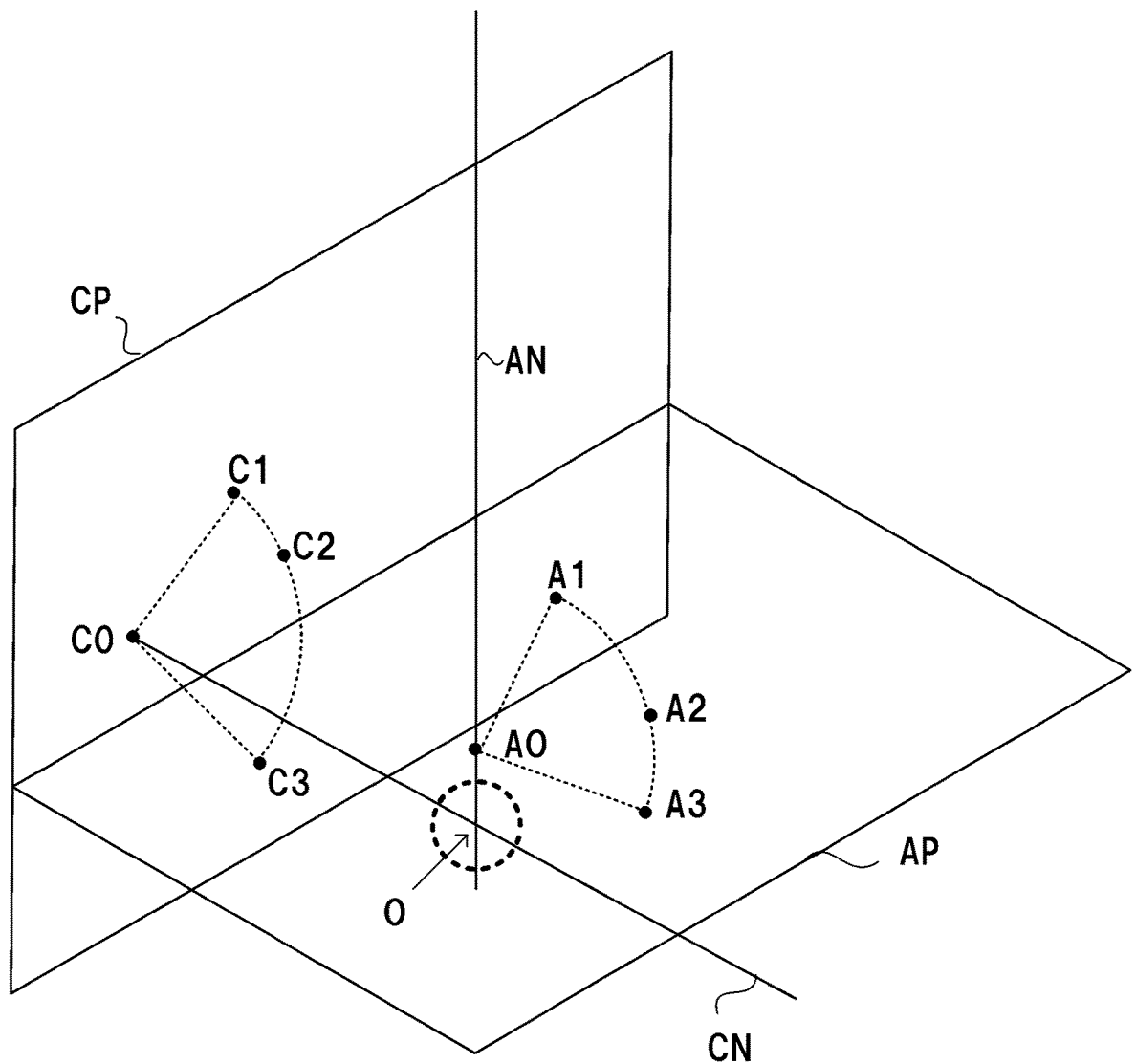
FIG. 15 is a schematic diagram illustrating a method for obtaining positions of rotation centers in the geometric deviation measurement step according to the embodiment.

FIG. 11 is a schematic diagram of the touch probe 62 and the reference sphere 63 which is installed on the swivel table 5 according to the embodiment, and FIG. 12 is a schematic diagram illustrating a state in which the tilt table 4 is rotated around the A-axis in the geometric deviation measurement step according to the embodiment. In addition, FIG. 13 is a schematic diagram illustrating a state in which the swivel table 5 is rotated around the C-axis in the geometric deviation measurement step according to the embodiment, and FIG. 14 is a flow chart showing the geometric deviation measurement step according to the embodiment. FIG. 15 is a schematic diagram illustrating a method for obtaining positions of rotation centers in the geometric deviation measurement step according to the embodiment.

The geometric deviation measurement step is started in a state that the touch probe 62 is mounted on the mounting unit 8 of the processing head 2 in advance and the reference sphere 63 is mounted on the swivel table 5 in advance (FIG. 11).

The geometric deviation measurement unit 523 reads the measurement angle λ_θm or λ_φm from the storage unit 40, rotates the tilt table 4 around the A-axis at the measurement angle λ_θm, and measures the position of the reference sphere 63 by using the touch probe 62. FIG. 12 shows an example in which the tilt table 4 is rotated around the A-axis at the measurement angles λ_θ1, λ_θ2, and λ_θ3, and the position of the reference sphere 63 is obtained for each measurement angle. Similarly, the swivel table 5 is rotated around the C-axis at the measurement angle λ_φm, and the position of the reference sphere 63 is measured using the touch probe 62. FIG. 13 shows an example in which the swivel table 5 is rotated around the C-axis at the measurement angles λ_φ1, λ_φ2, and λ_φ3, and the position of the reference sphere 63 is obtained for each measurement angle. In this way, the position of the reference sphere 63 is measured for each measurement angle with respect to all the rotation axes for which the geometric deviations are obtained (S301).

Next, the center position of the reference sphere 63 is calculated for each of the measurement angles λ_θm and λ_φm from the position of the reference sphere 63 measured by the touch probe 62 (S302).

Then, the directions of the rotation centers of the A-axis and C-axis are calculated from the center position of the reference sphere 63 obtained for each of the measurement angles λ_θm and λ_φm (S303). Specifically, a plane is obtained which includes three points at the center position of the reference sphere 63 obtained for each measurement angle λ_θm, and a normal vector of the plane is set as the direction of the rotation center of the A-axis. Similarly, a plane is obtained which includes three points at the center position of the reference sphere 63 obtained for each measurement angle λ_φm, and a normal vector of the plane is set as the direction of the rotation center of the C-axis.

Furthermore, the positions of the rotation centers are calculated (S304). Specifically, as shown in FIG. 15, three points A1, A2, and A3 of the center position of the reference sphere 63 obtained for each measurement angle λ_θm are made to approximate an arc, and a center point A0 of the arc is obtained. Then, a center line AN is obtained that passes through the center point A0 of the arc and is parallel to a normal vector of a plane AP including the three points A1, A2, and A3 of the center position. Similarly, three points C1, C2, and C3 of the center position of the reference sphere 63 obtained for each measurement angle λ_φm are made to approximate an arc, a center point C0 of the arc is obtained, and a center line CN is obtained that passes through the center point C0 of the arc and is parallel to a normal vector of a plane CP including the three points C1, C2, and C3 of the center position.

A point closest to the center line CN among the points on the center line AN is set as the position of the rotation center of the A-axis, and a point closest to the center line AN among the points on the center line CN is set as the position of the rotation center of the C-axis (S304).

In this way, among the command angles of the processing program used when processing the work piece, angles having a high usage frequency are used as the measurement angles for measuring the geometric deviations, and thus, positions and directions of more accurate rotation centers can be obtained.

1. Second Embodiment

Figure 16:
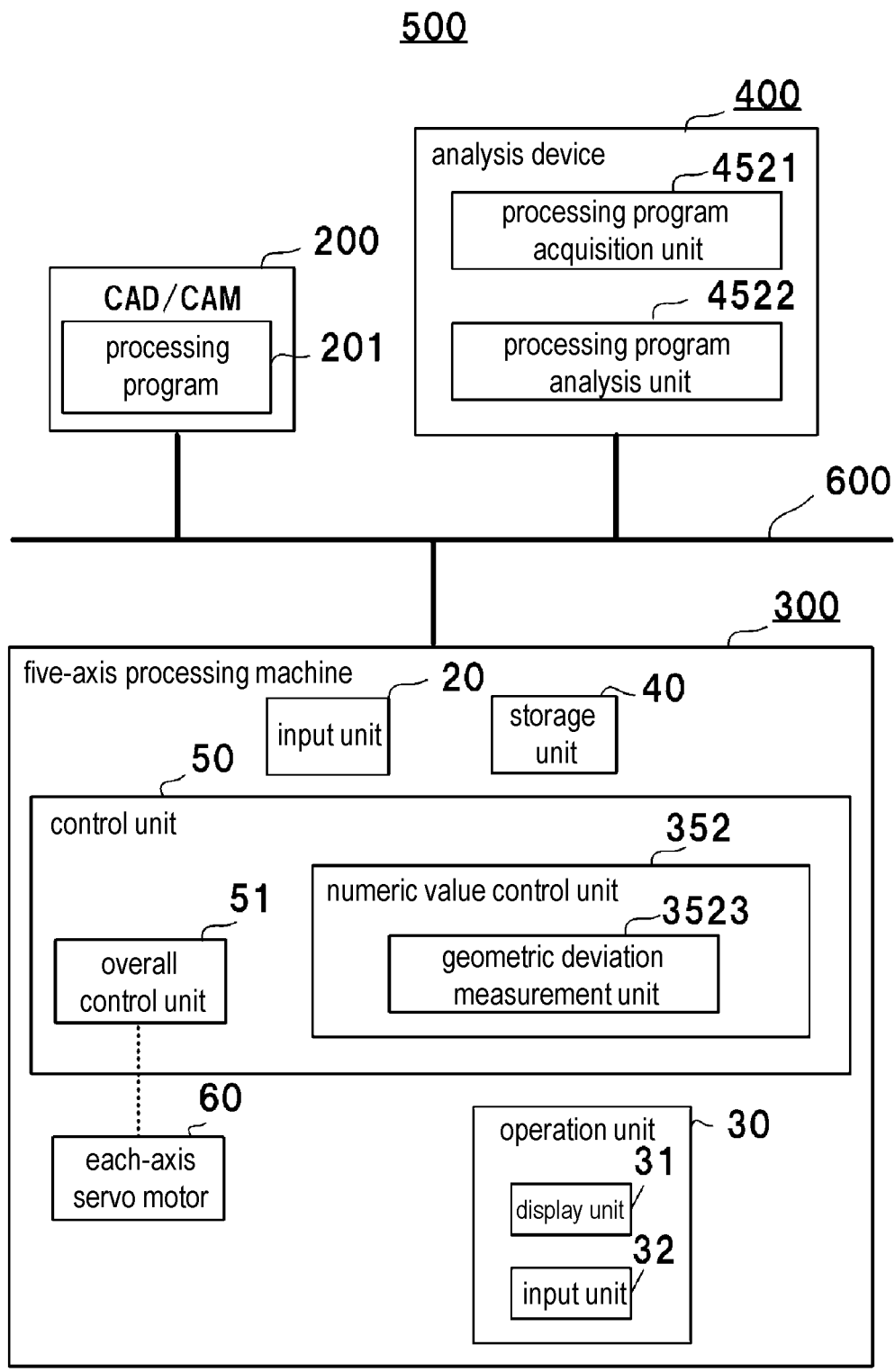
FIG. 16 is a block diagram of a five-axis processing system 500 according to a second embodiment of the disclosure.

FIG. 16 is a block diagram of a five-axis processing system 500 according to a second embodiment of the disclosure. Moreover, in each drawing and each embodiment described in the specification, the same reference signs are given to the same configuration elements, and description thereof is omitted as appropriate.

The five-axis processing system 500 is configured by an analysis device 400, the CAD/CAM device 200, and a five-axis processing machine 300, and each device is connected via a network 600.

The network 600 is a communication network such as the Internet, LAN, or the like, and transmits information by wire or wirelessly.

The analysis device 400 is a device that acquires the processing program 201 from the CAD/CAM device 200 via the network 600, calculates measurement angles for each rotation axis from the processing program 201, and transmits the measurement angles to the five-axis processing machine 300.

The analysis device 400 includes a processing program acquisition unit 4521 and a processing program analysis unit 4522.

The processing program acquisition unit 4521 executes a processing program acquisition step and acquires the processing program 201 transmitted from the CAD/CAM device 200.

The processing program analysis unit 4522 executes a processing program analysis step. The processing program analysis unit 4522 analyzes the processing program acquired by the processing program acquisition unit 4521, and refers to the command angles θn and φn with respect to the two rotation axes for each processing block in the processing program 201. Then, the frequency distributions are calculated from the command angles θn and φn of the two rotation axes that are referred to, the measurement angles λ_θm and λ_φm for measuring the geometric deviations are calculated, and the measurement angles λ_θm and λ_φm are transmitted to the five-axis processing machine 300.

Because details of the processing program analysis step are the same as those in the first embodiment, description thereof is omitted.

The five-axis processing machine 300 is a processing machine that performs control of five axes including three linear axes of an X-axis, a Y-axis, and a Z-axis and two rotation axes, and includes a geometric deviation measurement unit 3523 as a numeric value control unit 352.

The geometric deviation measurement unit 3523 executes a geometric deviation measuring step, and the geometric deviation measurement unit 3523 rotates the reference sphere 63 at the measurement angles λ_θm and λ_φm acquired from the analysis device 400 to measures a position of the reference sphere 63, thereby calculating directions and positions of actual rotation centers of the rotation axes and storing the directions and positions in the storage unit 40.

Because details of the geometric deviation measurement step are the same as those in the first embodiment, description thereof is omitted.

In this way, the processing program acquisition step and the processing program analysis step are executed by the analysis device different from the multi-axis processing machine, and thereby the measurement angles are calculated in advance, and the geometric deviation measurement step is executed using the measurement angles already calculated on the multi-axis processing machine immediately before processing the work piece. By performing each step with different devices, an initial setting time before processing the work piece can be shortened.

3. OTHER EMBODIMENTS

Although the embodiments of the disclosure are described above, the application of the disclosure is not limited to the above contents.

For example, the two rotation axes are arranged on the sides of the tilt table 4 and the swivel table 5, but the disclosure is not limited to this form. For example, the disclosure can be also applied to a five-axis control processing machine having a form in which one axis is arranged on a table side and one axis is arranged on a tool side or a form in which two axes are arranged on a tool side.

In addition, in the embodiments of the disclosure, the five-axis control processing machine is described which has the three linear axes of the X, Y, and Z axes and the two rotation axes of the A and C axes, but the disclosure is not limited to this form. For example, the control may be performed by rotation of a B-axis (that is, a rotation axis parallel to the Y-axis) instead of the A-axis, or the disclosure can also be applied as a multi-axis processing machine to a six-axis control working machine which includes three linear axes of X, Y, and Z axes and three rotation axes of A, B, and C axes.

Although the various embodiments according to the disclosure are described above, these embodiments are presented as examples and are not intended to limit the scope of the disclosure. The novel embodiments can be implemented in various other forms, and various omissions, replacements, and changes can be made without departing from the gist of the disclosure. The embodiments and modifications thereof are included in the scope and the gist of the disclosure, and are included in the scope of the disclosure described in the claims and the equivalent scope thereof.

What is claimed is:

1. A rotation center measurement method of multi-axis processing machine comprising:
   a processing program acquisition step in which a processing program configured by a plurality of processing blocks is acquired;
   a processing program analysis step in which command angles of tool postures are read from the processing program and analyzed, and measurement angles are calculated based on the analysis results; and
   a geometric deviation measurement step in which tables on which a reference sphere is placed and a tool for processing a work piece are relatively moved to measure a position of the reference sphere using the calculated measurement angles, and directions and positions of rotation centers of rotation axes of the multi-axis processing machine are calculated.

2. The rotation center measurement method of multi-axis processing machine according to claim 1, wherein in the processing program analysis step, frequency distributions of the command angles are calculated, and the command angles having a high appearance frequency are used as the measurement angles.

3. The rotation center measurement method of multi-axis processing machine according to claim 2, wherein in the processing program analysis step, the command angles whose appearance frequency exceeds a predetermined threshold value are calculated from the frequency distributions, and a lower limit value, an upper limit value, and a median value among the command angles whose appearance frequency exceeds a predetermined threshold value are used as the measurement angles.

4. A multi-axis processing machine which relatively moves tables and a tool, comprising:
   the tables on which a work piece is placed; the tool for processing the work piece; servo motors which are arranged on the tables and the tool; an overall control unit which drives the servo motors; and a numeric value control unit which calculates directions and positions of rotation centers of rotation axes of the multi-axis processing machine, wherein
   the numeric value control unit comprises:
   a processing program acquisition unit which acquires the processing program;
   a processing program analysis unit which reads command angles of tool postures from the processing program and analyzes the command angles, and calculates measurement angles based on the analysis results; and
   a geometric deviation measurement unit which relatively moves the tables on which a reference sphere is placed and the tool to measure a position of the reference sphere using the calculated measurement angles, and calculates directions and positions of the rotation centers.

* * * * *